June 19, 1934.   M. C. DODGE   1,963,939
ANTISKID DEVICE
Filed Oct. 29, 1932   2 Sheets-Sheet 1
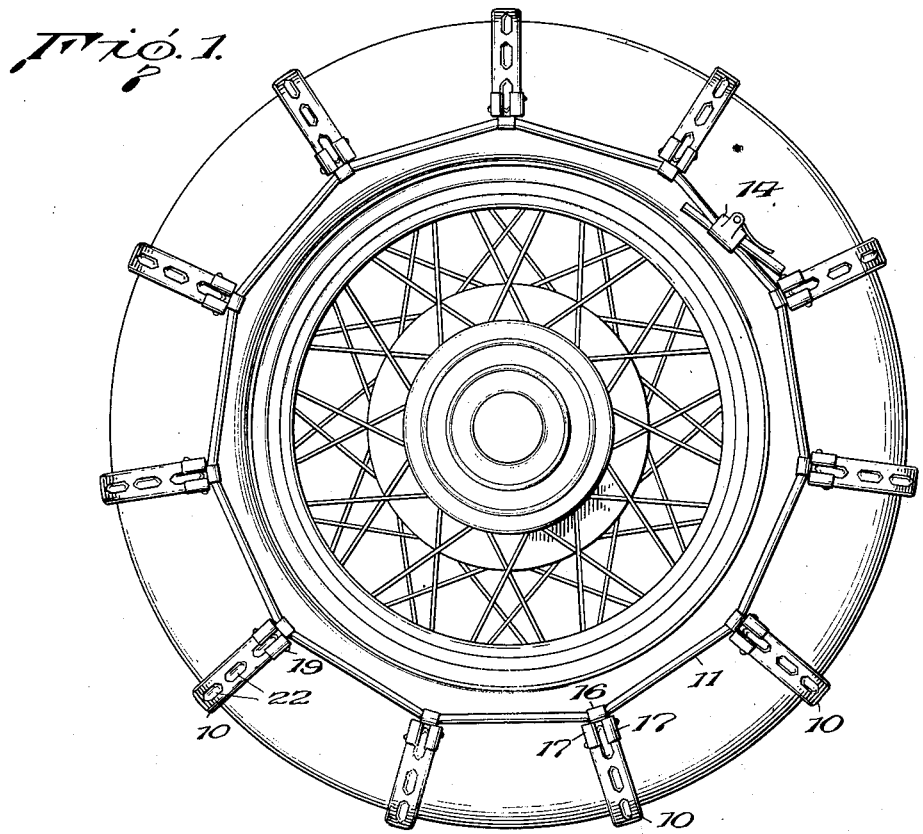
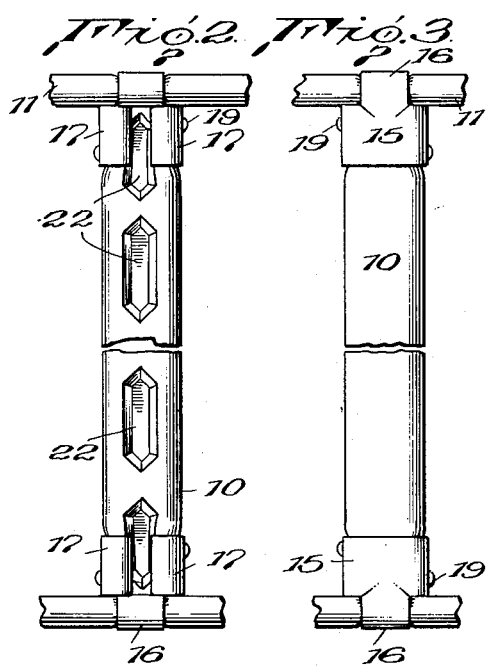
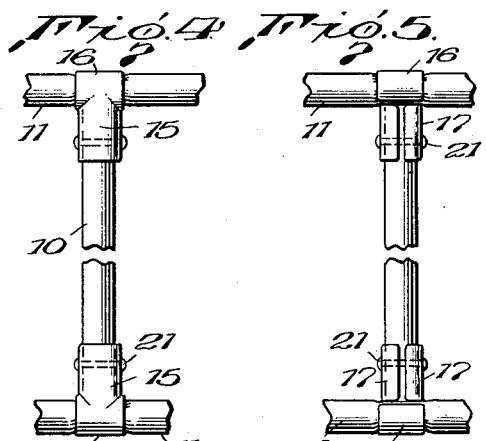
Inventor
Milo C. Dodge,
By Church & Church
His Attorneys June 19, 1934.　　　　M. C. DODGE　　　　1,963,939
ANTISKID DEVICE
Filed Oct. 29, 1932　　　2 Sheets-Sheet 2
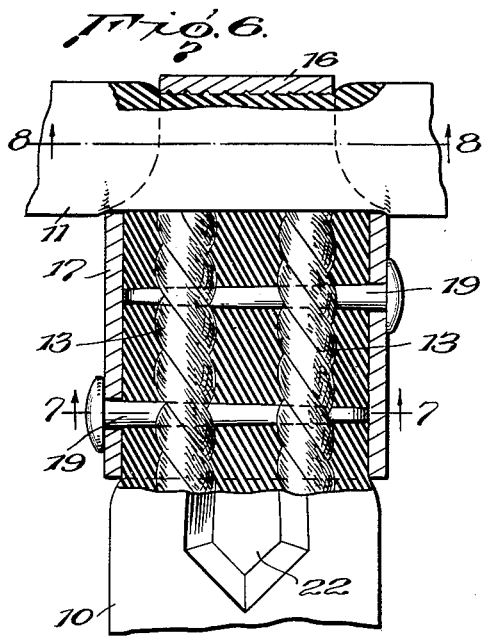
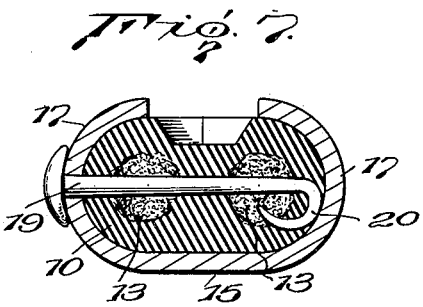
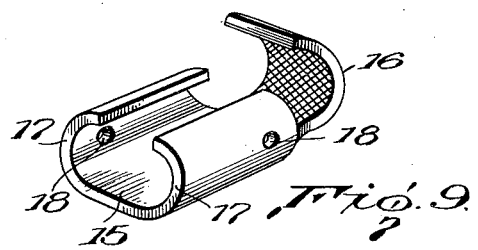
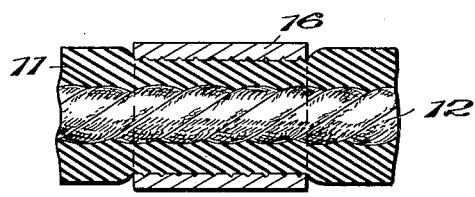
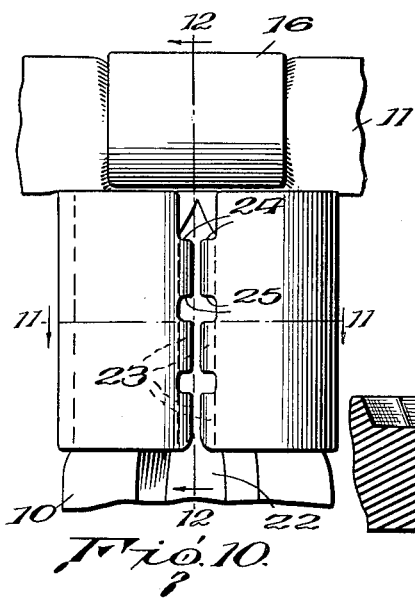
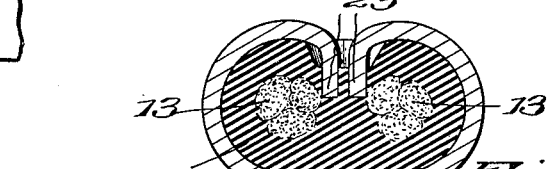
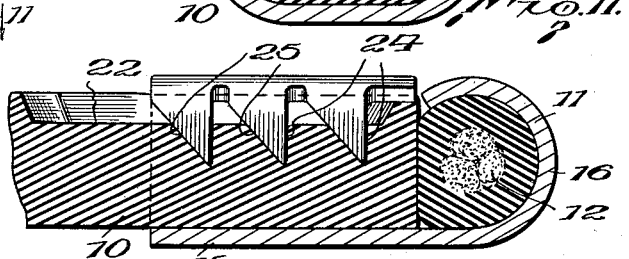
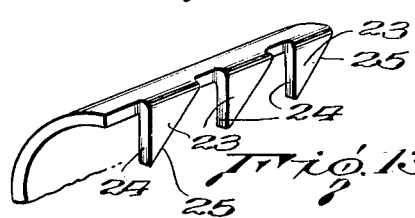
Inventor
Milo C. Dodge,
By Church & Church
His Attorneys

UNITED STATES PATENT OFFICE 1,963,939

ANTISKID DEVICE

Milo C. Dodge, Auburn, N. Y., assignor to Columbian Rope Company, Auburn, N. Y., a corporation of New York Application October 29, 1932, Serial No. 640,277

9 Claims. (Cl. 152—14)

This invention relates to improvements in antiskid devices especially adapted for use on vehicle wheels.

One object of the invention is to provide an efficient but comparatively inexpensive anti-skid device of light weight construction and which can be easily applied to and removed from a wheel.

Another object is to provide an anti-skid device that will not scratch or mar the appearance of the wheel to which it is applied.

A still further object is to provide a novel, simple, effective form of connection between the elements of the device. More specifically, the invention contemplates an anti-skid device composed of resilient, compressible side members that extend circumferentially of the wheel and to which the tread traversing or cross members are attached by connecting elements that are held against movement on the side members, circumferentially of the wheel, by protuberances formed by the end walls of depressions in said side members. These connecting elements which may be attached to cross members in any desired manner, are formed with a side member encircling portion that is pressed around the side members with sufficient pressure to embed them in the side members. Due to the resiliency of the side members, this compression of portions thereof, by the encircling portion of the connecting elements, causes depressions to be formed in the side members, the end walls of said depressions engaging against the edges of said encircling portion whereby the cross members are held against creeping circumferentially of the wheel.

A still further object consists in providing novel arrangements for attaching said connecting elements to said cross members. The cross members preferably consist of rubber in which is embedded one or more cores in the form of groups of fibers, usually small three-strand ropes, and one arrangement for attaching the connecting element consists in forming said element with curved side pieces adapted to embrace the cross member, each side piece having a perforation therein through which a nail is driven. The penetrating point of each nail passes through the rubber and fibers and upon encountering the opposite curved side piece of the connecting element, is upset or turned back into the cross member. Where dual cores are used in the cross member, the reversely bent end of the nail re-enters one of the cores.

In another form of attachment for the connecting element, the side pieces of the latter are formed with prongs which are forced into the cross member. Preferably, said prongs are tapered with one edge of the prong lying at right angles to the longitudinal center and opposed to any strains that might be placed upon the member and which would tend to pull the member from the connecting element.

With these and other objects in view, the invention consists in certain novel details of construction and combinations and arrangements of parts, all as will be hereinafter more fully described and the novel features thereof particularly pointed out in the appended claims.

In the accompanying drawings,

Figure 1 is a side elevation of a wheel to which the present device has been applied;

Fig. 2 is a plan view of the road-engaging surface of one of the cross members, this form of member being provided with dual cores;

Fig. 3 is a like view of the tread-engaging face of the member shown in Fig. 2;

Fig. 4 is a view similar to Fig. 2, showing a single-core cross member;

Fig. 5 illustrates the tread-engaging surface of the cross member shown in Fig. 4;

Fig. 6 is a view, partly in section, illustrating in detail the attachment of the connecting element to the cross and side members of the device, nails being used in this instance;

Fig. 7 is a sectional view on the line 7—7 of Fig. 6;

Fig. 8 is a sectional view on the line 8—8 of Fig. 6;

Fig. 9 is a perspective view of one of the connecting elements;

Fig. 10 is a detail view illustrating a still further mode of securing the connecting elements to the cross member;

Fig. 11 is a sectional view on the line 11—11 of Fig. 10;

Fig. 12 is a sectional view on the line 12—12 of Fig. 10;

Fig. 13 is a perspective view of a portion of the connecting member used in the construction shown in Fig. 10.

As illustrated in Fig. 1, the present device consists of a plurality of tread-traversing or cross members 10 connected to side members 11 formed with cores of fibers 13, preferably small, three-strand rope, covered with rubber. The use of cores renders the side members inextensible while the rubber exterior prevents scratching the wheel and facilitates attachment of the cross members as will be described in detail later.

The cross members 10 are also of rubber but, in the preferred construction, they are provided with two cores 13, whereby they can be made rather broad and flat. This form of cross member is fully described and claimed in an application filed by Harold G. Metcalf and Kenneth H. Bowen. For securing the device on the wheel, each side member has attached to one of its ends a clamping device 14 in which the other end of the member can be firmly secured.

The cross members, in each form of the invention, are secured to the side members by connecting elements 15, the end portions 16 of which are clamped around the side members and the curved side portions 17 of which embrace the cross members. The inner surface of the end portion 16 may be formed with knurling, as shown in Fig. 9, but circumferential creeping of the cross members with respect to the side members is primarily prevented by the clamping end portions 16 being embedded in the rubber of the side members. More specifically, the rubber covering of the side members, being resilient, is placed under compression at those points embraced by the end portions 16 of the connecting elements and the rubber adjacent the side edges of the ends 16 is caused to protrude somewhat beyond its normal diameter. In other words, where the confining portions 16 of the clamps surround the side members, the latter are compressed to form depressed seats for the clamps, the end walls of these seats substantially forming protuberances on the side members with each end portion 16 of a connecting element embedded in the side member between a pair of these protuberances so that the latter hold the connecting elements against movement longitudinally of said side members.

The preferred mode of attaching the connecting elements to the cross members is shown in Figs. 1 to 3 and 6 to 9. The curved side portions 17 which embrace the cross members each have an orifice 18 therein, but the orifices in the opposite walls do not register with each. To secure a connecting element to a cross member, the sides 17 are clamped around the cross member and nails 19 inserted in orifices 18 and driven through the cross member as shown in Fig. 6. It will be noted that the penetrating ends of the nails are upset or bent back, as at 20, so as to reenter one of the cores of the cross member. This is accomplished by using nails of sufficient length that when the point of the nail encounters the inner surface of the side of the connecting element it will curl or take a reverse bend and finally reenter the last core through which it was driven.

In the modification illustrated in Figs. 4 and 5, the cross members 10 are substantially circular in cross section, there being only one core therein. In this construction, rivets 21 are utilized for securing the connecting elements 15 to the cross members.

Referring to Figs. 10 to 13, a still further form of attaching means for securing the connecting elements to the cross members is shown. As in the preferred construction, the road-engaging face of the cross members has formed therein one or more depressions 22, but in this instance the nails 19 are dispensed with and prongs 23 formed integrally with the connecting element are embedded in the cross members. Preferably, prongs 23 are at the turned in edges of the sides 17 of the connecting element and each prong is formed with a straight edge 24 and an inclined edge 25 to form a tapered penetrating point. It will be observed that the straight edge 24 is disposed at right angles to the longitudinal axis of the cross member and that the straight edge of one prong on each side of the connecting element is positioned against the end wall of one of the depressions 22. With this arrangement, maximum resistance is offered to any longitudinal strains tending to pull the cross member out of the encircling sides 17 of the connecting element. In each instance, the ends of the cross members abut the side members, thereby lending to the rigidity of the joint. From the foregoing, it will be apparent that by compressing the connecting clamps around the side members to overcome the flexibility of the side members within the confines of the clamping portions of the connectors, there is provided a substantially rigid torsion-resistant connection or interlock between the cross and side members whereby, as the cross members move into and out of engagement with the road surface, there will be no wear, by abrasion, at the joints between the cross members and side members. In other words, although resilient materials are used in order to increase the life of the device as a whole, by forming a rigid connection between the side members and cross members, wear cannot be imposed upon the device at these particular points by any abrasive action brought about by relative movement of the cross members with respect to the side members.

From the foregoing, it will be apparent that there is provided an efficient anti-skid device of simple construction, especially insofar as the attachment of the side and cross members is concerned.

This application is a continuation, in part, of applicant's copending case, Serial No. 606,005 which matured as Patent No. 1,932,576, October 31, 1933.

What I claim is:

1. An anti-skid device comprising side members, tread-traversing cross members of nailable material, metallic fittings attached to said side members and having side portions embracing the cross members, and a nail extending through each side portion of each fitting and through the cross member embraced by said fitting, the entering end of each nail engaging the opposite side portion of each fitting and being offset.

2. An anti-skid device comprising side members, tread-traversing cross members having substantially inextensible fiber centers and rubber exteriors, a metal clip embracing each end of the cross members, a nail extending through each side of each clip and through the cross member to which the clip is applied, the entering end of each nail being upset against the opposite side of the clip, and means for attaching the clips to said side members.

3. An anti-skid device comprising side members, a tread-traversing cross member formed with a resilient exterior, recessed at each end of the road-engaging surface, and a connecting element at each end of said cross member attached to said side members, said connecting elements having inturned portions penetrating said cross members at the ends of said recesses.

4. An anti-skid device comprising side members, a tread-traversing cross member formed with a resilient exterior, recessed at each end of the road-engaging surface, and a connecting element at each end of said cross member attached to said side members, said connecting elements having tapered inturned portions penetrating said cross member, one edge of each tapered portion extending at right angles to the longitudinal axis of the cross member to resist longitudinal strains imposed on said member.

5. An anti-skid device comprising side members and cross members each formed of a flexible, inextensible core protected within a sheathing of resilient rubber and means for rigidly securing the cross members to the side members, said means comprising rigid metallic connectors each comprising a portion clamped upon and gripping the material of the side member to compress the resilient rubber against the inextensible core within said member to overcome the flexibility of the core and rubber covering within the confines of said connecting member to thereby provide a substantially rigid connection between the cross members and side members.

6. An anti-skid device consisting of rubber covered side members having flexible, inextensible cores embedded therein, tread traversing cross members, and rigid metallic connecting members for securing the cross members to the side members, each connecting member comprising means clamped upon and gripping the material of the side member to compress the resilient rubber against the inextensible core of said side member and form depressed seats in the surface of the side member for the connecting member, the end walls of said seats preventing circumferential movement of the cross member on said side member.

7. An anti-skid device comprising a pair of flexibile rubber sheathed, inextensible side members, a plurality of flexible, rubber sheathed inextensible cross members, and means for rigidly securing the ends of said cross members to said side members, said means comprising rigid metal connectors each comprising a portion attached to an end of a cross member and a tubular end portion permanently contracted about the adjacent portion of one of said side members to such an extent as to constrict and stiffen the portion of the side member thus engaged and provide a rigid torsion-resistant interlock therewith.

8. An anti-skid device comprising side members and cross members each formed of a flexible, inextensible core protected by a sheathing of resilient rubber, and metallic connecting members for securing the cross members to the side members, each connecting member comprising means clamped upon and gripping the material of said side members to compress the resilient rubber against the inextensible core to overcome the flexibility of the core and rubber covering within the confines of the connecting members to provide a substantially rigid connection between the cross members and side members, and the compression of said side members by the connecting members being such that depressed seats for the connecting members are formed in the side members with the end walls of said depressed seats preventing circumferential movement of the cross members on the side members.

9. An anti-skid device comprising side members and cross members each formed of a flexible, inextensible core protected within a sheathing of resilient rubber, a metallic fitting forming a rigid joint between each end of said cross members and the adjacent portion of its respective side member, each end of each cross member being in substantial abutment against its side member, said fitting having a clamping part engaged around and gripping the material of the side member to compress the resilient rubber against the inextensible core to overcome the flexibility of the core and covering within the confines of said gripping portion of the connecting member, thereby providing a rigid torsion-resistant interlock between the cross member and side member.

MILO C. DODGE.